United States Patent Office 2,858,341
Patented Oct. 28, 1958

2,858,341
PRODUCING BIS-(DICHLORMETHYL) SULFONE

Howard N. Dole, Haverhill, Mass., assignor to Monsanto Chemical Company, St. Louis, Mo., a corporation of Delaware No Drawing. Application March 31, 1951
Serial No. 218,699

7 Claims. (Cl. 260—607)

The present invention relates to a new chemical compound and to a process of preparing such compound.

It is one object of this invention to provide a new chemical compound, namely bis-(dichlormethyl) sulfone.

It is a further object of this invention to provide a process for preparing bis-(dichlormethyl) sulfone.

Still further objects and advantages of this invention will appear in the following description and the appended claims.

The new chemical compound bis-(dichlormethyl) sulfone, having the structural formula

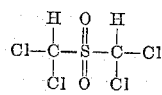

is prepared, in general, in accordance with the present invention by reacting chlorine with thio-bis acetic acid (also known as thiodiglycolic acid) or its water-soluble salts as, for example, its alkali metal or ammonium salts, in an aqueous solution under acidic conditions and at low temperatures, that is, temperatures ranging from just about the freezing point of the solution to about 20° C. The bis-(dichlormethyl) sulfone precipitates from the solution as it is formed and is readily separated from the liquid of the solution by filtration, decantation or centrifuging. The product is readily purified by recrystallization from ethyl alcohol.

In carrying out the reaction described above, it is possible to add the thio-bis acetic acid or its water-soluble salts or aqueous solutions thereof to a water solution of chlorine after which additional chlorine is added to the solution. However, for convenience and best results, it is preferred to add the chlorine to the aqueous solution of thio-bis acetic acid or its water-soluble salts, as for example, by passing chlorine gas into such solution. The initial solution of the thio-bis acetic acid or its water-soluble salts may be acidic, neutral or alkaline, but rapidly becomes acidic as chlorine is added to the solution so that the conversion of the thio-bis acetic acid or the salt thereof to bis-(dichlormethyl) sulfone takes place under acidic conditions.

The process described above is readily carried out by reacting the chlorine and thio-bis acetic acid or its water-soluble salts in the presence or absence of light.

The amount of chlorine used in relation to the thio-bis acetic acid or its water-soluble salts employed may be varied considerably. Thus, it is possible to use less chlorine than the 6 mols (12 atoms) of chlorine theoretically required to convert all of the thio-bis acetic acid or its water-soluble salts to the bis-(dichlormethyl) sulfone in which case some of the acid or its water-soluble salts is oxidized to the sulfone acid and remains in the solution. It is also possible to use an amount of chlorine in excess of the theoretical amount since the bis-(dichlormethyl) sulfone precipitates out of the solution as it is formed and does not react further with excess chlorine in the solution under the acidic conditions existing in the solution. It is desirable, however, to use at least 6 mols (12 atoms) of chlorine for each mol of the thio-bis acetic acid or its water-soluble salts, and it is preferred to use from 6 to 10 mols (12 to 20 atoms) of chlorine for each mol of thio-bis acetic acid or its water-soluble salts for best results and to obtain a high yield of the bis-(dichlormethyl) sulfone.

As hereinbefore mentioned, the reaction between the chlorine and the thio-bis acetic acid is carried out at low temperatures, that is, at temperatures ranging from just above the freezing point of the solution (so that the solution is still fluid) to about 20° C. In some instances, however, it is possible to keep the solution at temperatures as high as 25° C. However, the reaction tends to proceed slowly at such higher temperature. At still higher temperatures, for example, at 40° C. no appreciable reaction takes place in the absence of light. Best results are obtained at temperatures of about —2 to +5° C. and these temperatures are accordingly preferred.

The duration of the reaction varies considerably under the above-described conditions depending on the amount of chlorine used, the concentration of the solution and the temperature of the solution. Longer reaction times are required at the higher temperatures. In general, the reaction may be discontinued at any time after the bis-(dichlormethyl) sulfone begins to precipitate out of solution, but the reaction may be continued until no further precipitation of the bis-(dichlormethyl) sulfone is noted. In most cases the reaction is complete within a period of 5 to 20 hours depending primarily on the rate at which chlorine is passed into the solution.

Bis-(dichlormethyl) sulfone is a white, crystalline solid which is toxic to tribolium and is also toxic on residue to milkweed bugs. Thus, it may be used in insecticidal compositions employed against these insects. It is also useful as a hot solvent for various organic chemicals when it is heated above its melting point. Bis-(dichlormethyl) sulfone contains two reactive hydrogen atoms and may be used as a chemical intermediate in the organic synthesis of other compounds.

A further understanding of the compound and processes of this invention will be obtained from the following specific examples which are intended to illustrate the invention but are not intended to limit the scope thereof, parts and percentages being by weight unless otherwise specified.

EXAMPLE I

A. *Preparation of sodium salt of thio-bis acetic acid*

Two hundred and eighty-three and five-tenths parts (3 mols) of monochloracetic acid were dissolved in 900 parts of water and the resulting solution was neutralized with 202 parts (1.9 mols) of sodium carbonate dissolved in 605 parts of water to form a solution of sodium monochloracetate. Two hundred and fourteen and five-tenths parts of 60% sodium sulfide (1.65 mols) were dissolved in 900 parts of water and this solution was added to the above solution of sodium monochloracetate and the whole was allowed to stand for 3 hours at room temperature. At the end of this time a solution having a pH between 11 and 12 and containing 1.5 mols of the disodium salt of thio-bis acetic acid was obtained. This solution was then adjusted to a pH of 7 with concentrated hydrochloric acid to destroy the unreacted sodium sulfide.

B. *Preparation of bis-(dichlormethyl) sulfone*

The solution prepared as described above was cooled to a temperature between 0 and 5° C. and chlorine gas was passed into the solution while the solution was being stirred and maintained at a temperature between 0 and 5° C. until a total of 640 parts (9 mols) of chlorine were absorbed in the solution. The addition of chlorine was carried out in the absence of light. The rate of addition of the chlorine gas was such that essentially all of the first 2 mols of chlorine added were absorbed in the solution.

A white solid precipitate formed in the solution within about 10 minutes after the first 4 mols of chlorine gas had been absorbed in the solution. Additional precipitate formed as additional amounts of chlorine gas were added. After all (640 parts) of the chlorine gas had been absorbed the solution was filtered. The filter cake was washed with a small amount of water and then finally dried at 70° C. The total weight of the dry filter cake was 280 grams and this product melted between 103 and 105° C. The product was recrystallized from ethyl alcohol, in which it was readily soluble, and after drying was obtained in the form of a white, crystalline solid. This solid had a melting point of 103 to 104° C. An analysis of this product showed that it contained 10.35% carbon; 61.47% chlorine; 13.77% sulfur; 13.95% oxygen; and 1.03% hydrogen. The theoretical composition of bis-(dichlormethyl) sulfone is as follows: 10.35% carbon; 61.24% chlorine; 13.82% sulfur; 13.80% oxygen and 0.87% hydrogen.

EXAMPLE II

A. *Preparation of thio-bis acetic acid*

A solution containing 1.5 mols of the disodium salt of thio-bis acetic acid was prepared as described in the first paragraph of Example I, after which the solution was acidified to a pH of 2 with concentrated HCl to obtain a solution of thio-bis acetic acid.

B. *Preparation of bis-(dichlormethyl) sulfone*

Chlorine gas was passed into the above solution after the solution had been cooled to a temperature of 0 to 5° C. while the solution was being stirred and maintained at a temperature of 0° C. until a total of 9 mols (18 atoms) of chlorine were absorbed in the solution. The addition of chlorine was carried out in the absence of light and the chlorine was added at such a rate that the first 2 mols of chlorine were substantially completely absorbed in the solution. A solid precipitate formed in the solution and after all of the chlorine had been added the solution was filtered. The filter cake was washed with a small amount of water and then dried at 70° C. The crude product, which melted at 103 to 105° C., was recrystallized from ethyl alcohol. The resulting product had substantially the same melting point and chemical composition as the product prepared according to the procedure of Example I.

EXAMPLE III

Bis-(dichlormethyl) sulfone was prepared using the same procedure and reactants described in Example I with the exception that the reaction was carried out in the presence of light and while the solution was being irradiated with ultra-violet light.

The product was the same as obtained in Example I, that is, it had the same melting point and chemical composition.

Various modifications and changes may be made in in the processes described herein as will be apparent to those skilled in the art to which this invention appertains without departing from the intent and spirit of this invention. It is to be understood therefore that the present invention is to be limited only by the scope of the appended claims.

What is claimed is:

1. A process which comprises reacting chlorine and a substance selected from the group consisting of thio-bis acetic acid and water-soluble salts of said acid in an aqueous solution under acidic conditions at a temperature ranging from just above the freezing point of the solution to 25° C., said chlorine being supplied in an amount sufficient to provide at least 6 mols of chlorine for each mol of said substance, and continuing the reaction until bis-(dichlormethyl) sulfone is formed and precipitates from solution.

2. A process which comprises reacting chlorine and a substance selected from the group consisting of thio-bis acetic acid and water-soluble salts of said acid in an aqueous solution under acidic conditions at a temperature ranging from just above the freezing point of the solution to 5° C., said chlorine being supplied in an amount sufficient to provide from about 6 to 10 mols of chlorine for each mol of said substance, and continuing the reaction under such conditions until bis-(dichloromethyl) sulfone is formed and precipitates from the solution.

3. A process according to claim 2 but further characterized in that said substance is thio-bis acetic acid.

4. A process according to claim 2 but further characterized in that said substance is a sodium salt of thio-bis acetic acid.

5. A process according to claim 2 but further characterized in that said substance is the disodium salt of thio-bis acetic acid.

6. A process which comprises reacting chlorine and a substance selected from the group consisting of thio-bis acetic acid and water-soluble salts of said acid in an aqueous solution under acidic conditions at a temperature ranging from just above the freezing point of the solution to 25° C., said chlorine being supplied to said solution in an amount sufficient to provide from 6 to 10 mols of chlorine for each mol of said substance, continuing the reaction under such conditions until bis-(dichlormethyl) sulfone is formed and precipitates from the solution, whereby no further chlorination of said sulfone takes place, and subsequently separating said sulfone from said solution.

7. A process which comprises reacting chlorine and a substance selected from the group consisting of thio-bis acetic acid and water-soluble salts of said acid in an aqueous solution under acidic conditions in the absence of light at a temperature ranging from just above the freezing point of the solution to 5° C., said chlorine being supplied to said solution in an amount sufficient to provide from 6 to 10 mols of chlorine for each mol of said substance, continuing the reaction under such conditions until bis-(dichlormethyl) sulfone is formed and precipitates from the solution, whereby no further chlorination of said sulfone occurs, and subsequently separating said sulfone from said solution.

References Cited in the file of this patent

UNITED STATES PATENTS

| 643,144 | Lederer | Feb. 3, 1900 |
| 2,127,400 | Gibbs | Aug. 16, 1938 |
| 2,176,181 | Hundsdiecker et al. | Oct. 17, 1939 |
| 2,678,953 | Conly | May 18, 1954 |

OTHER REFERENCES

Levin: Chem. Abstracts, vol 24, 4257[3] (1930). Abstracted from J. prakt. Chem., Band 127, pp. 77–91 (1930).

Larsson: Chem. Abstracts, vol. 44, col. 3893f, 1950 abstracted from Trans. Chalmers Univ. Technol., Gothenburg, No. 87, pp. 3–13 (1949).

Brown: Insect Control by Chemicals (Wiley & Sons, Inc.), 1951, pp. 65, 68 and 75.